(12) United States Patent
Göhring et al.

(10) Patent No.: US 6,276,229 B1
(45) Date of Patent: Aug. 21, 2001

(54) GAS-PEDAL MODULE

(75) Inventors: Frank Göhring, Frankfurt; Armin Wendling, Beltheim-Mannebach, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/417,569

(22) Filed: Oct. 14, 1999

(30) Foreign Application Priority Data

Oct. 19, 1998 (DE) .............................................. 198 48 087

(51) Int. Cl.[7] ...................................................... G05G 1/14
(52) U.S. Cl. ................................................. 74/513; 74/560
(58) Field of Search .............................. 74/513, 514, 512, 74/560

(56) References Cited

U.S. PATENT DOCUMENTS

| 2,944,439 | * | 7/1960 | Dalton | 74/513 X |
| 3,698,260 | * | 10/1972 | Shellhause | 74/560 |
| 5,697,260 | * | 12/1997 | Rixon et al. | 74/514 |
| 5,819,593 | * | 10/1998 | Rixon et al. | 74/514 |
| 6,070,489 | * | 6/2000 | Ananthasivan et al. | 74/512 |

FOREIGN PATENT DOCUMENTS

| 3533420 | * | 3/1987 | (DE) | 74/512 |
| 4300096A1 | | 7/1994 | (DE) . | |
| 4426549C2 | | 1/1996 | (DE) . | |
| 19521821C1 | | 12/1996 | (DE) . | |

* cited by examiner

Primary Examiner—Mary Ann Green
(74) Attorney, Agent, or Firm—Richard A. Speer; Mayer, Brown & Platt

(57) ABSTRACT

A gas-pedal module has a gas pedal (12) which is mounted pivotably in a housing and can be actuated, counter to a restoring spring, with pedal-force-dependent hysteresis, a pedal-position sensor producing an electric signal corresponding to the pedal position. In view of the high pedal forces, precise and expensive bearings are necessary in order to avoid jamming of the gas pedal (12). In order to reduce the production costs arid nevertheless reliably to prevent jamming, it is proposed to mount the gas pedal (12) in a floating manner in a bearing element (28) which has play in the upward direction. Specific selection of the coefficient of friction on the contact surface (30) between the bearing journal (18) and the bearing element (28) makes it possible to achieve a hysteresis as is desired in the case of such gas-pedal modules.

10 Claims, 5 Drawing Sheets

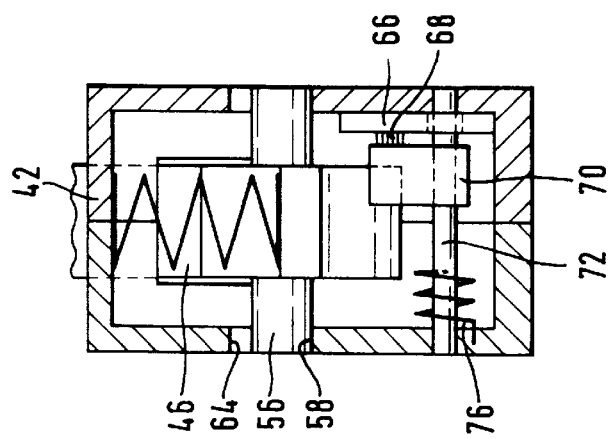
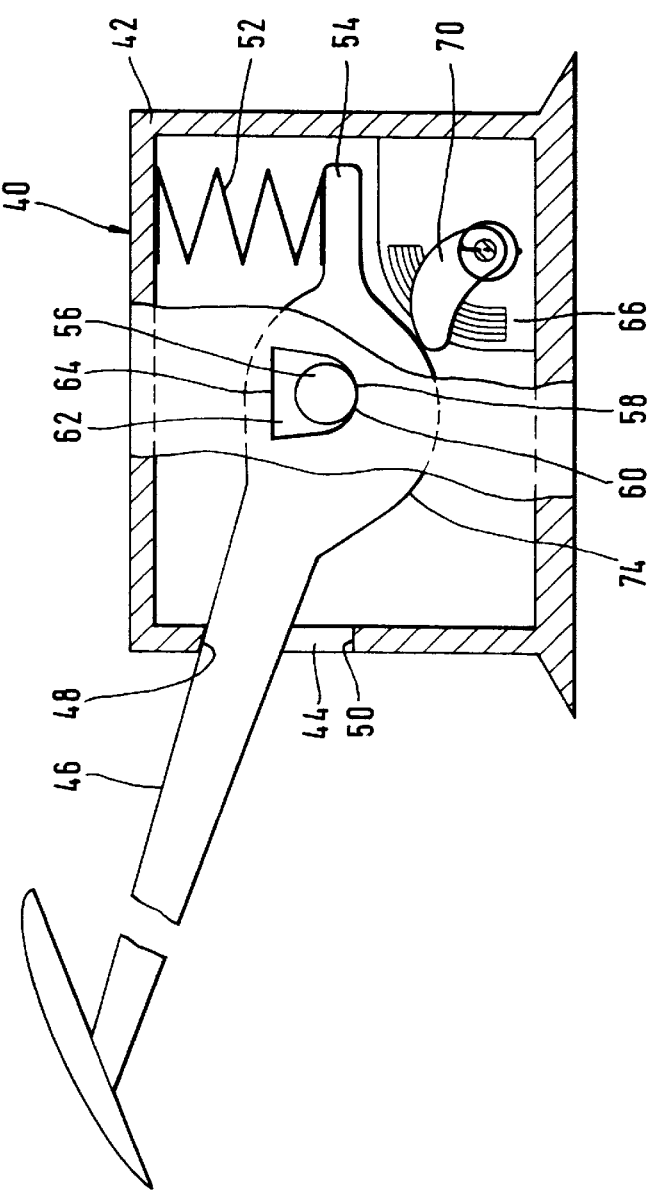

GAS-PEDAL MODULE

BACKGROUND OF THE INVENTION

The invention relates to a gas-pedal module having a gas pedal which is mounted in a housing and can be actuated, counter to the force of a restoring spring, with pedal-force-dependent hysteresis, and having a pedal-position sensor which produces an electric signal corresponding to the pedal position.

In gas pedals for motor vehicles, use is being made increasingly frequently of so-called "drive-by-wire" systems, in the case of which the gas pedal is no longer connected to the throttle via a Bowden wire, as has been the case up until now, but rather a sensor produces an electric output signal which corresponds to the gas-pedal position and passes, via lines, to an engine control system, which activates the throttle via an electric actuating motor in dependence on the signals.

From the Bowden wires which have usually been used up until now, the vehicle drivers are accustomed, during actuation of the gas pedal, to a force hysteresis which is derived from the frictional forces acting in the Bowden wire. These frictional forces set an increased resistance against the pressing-down action of the pedal and, when a certain gas-pedal position is being held, relieve the driver's foot of the restoring forces of the restoring spring. The counter pressure, when the gas pedal is pressed down, allows more precise positioning of the gas pedal, while the foot being relieved when a gas-pedal position is being held improves comfort.

With the "drive-by-wire" systems, attempts were made to maintain these desirable characteristics of the gas pedal, for which purpose a simulation of the properties of a Bowden wire with its restoring spring was necessary.

In order to simulate the hysteresis, use is usually made of direction-dependent frictional elements, as are outlined, for example, in DE 195 17 172. This document also discloses the conventional play-free mounting of the gas pedal in a housing. Since the mounting of the gas-pedal lever, on the one hand, has to be precise but also, at the same time, has to absorb very high pedal forces, a particularly high-quality, play-free mounting (for example needle bearings) has to be provided in order to avoid the possible occurrence of jamming. The costs of such a gas-pedal module are thus considerable.

BRIEF SUMMARY OF THE INVENTION

The object of the invention is to provide a gas-pedal module which can absorb high pedal forces and nevertheless does not involve the risk of the gas pedal jamming.

The object is achieved according to the invention in that the gas pedal is mounted in a floating manner in a bearing element which has play in the upward direction.

The bearing element, which is at least half-open, allows precise mounting of the gas pedal on the one hand and on the other hand, by virtue of the possibility of yielding in the upward direction, reliably prevents possible jamming of the gas pedal in its bearing location. In this case, a very small allowance for movement is sufficient in order to eliminate the risk of jamming reliably.

The solution according to the invention manages with extremely simple bearing elements, for example in the form of a half-shell.

The spring element is preferably a helical spring which, via a lever arm, produces a restoring moment which is directed counter to the moment provided by the actuating force about the pivot axis of the gas pedal. In this case, the force which is produced by the helical spring is preferably directed essentially counter to the bearing force of the gas pedal in the bearing element.

Consequently, both the actuating force and the restoring force of the spring are supported in the bearing element, this resulting in an increased friction moment when the pedal is pressed down, and thus in a certain hysteresis.

In order to achieve certain hysteresis characteristics, it is advantageous if the contact surface between the bearing element and a circumferential surface of the gas pedal is designed as a friction pairing with a certain coefficient of friction.

Such a configuration of the bearing element and of the mounted surface of the gas pedal makes it possible to achieve a hysteresis of the desired magnitude without separate components being used. In comparison with conventional designs with rockers, spring elements, frictional elements and damping elements, the mounting of which involves very high outlay in part, this constitutes a considerably simplification in design, which allows the production costs of gas-pedal modules to be reduced further without the mechanical properties being compromised.

It is also possible for the contact surface between the bearing element and the circumferential surface of the gas pedal to be subdivided into two circumferential-segment regions, which form two radial supporting locations. It is particularly advantageous here if at least one radial supporting location can be adjusted in the circumferential direction in relation to the circumferential surface of the gas pedal. This allows the characteristics of the gas-pedal module to be changed simply by adjusting a supporting location. This makes it possible to achieve simple adaptation of the frictional hysteresis, to a respective vehicle type, which corresponds to the character and the image of the vehicle. The development of a single gas-pedal module with a pedal housing and optimum friction-lining pairing is sufficient here, which makes a considerable contribution to the reduction of development costs. The force hysteresis is determined here from the following factors: coefficient of friction, geometry and normal force.

The gas-pedal travel is preferably limited in an idling position by a first stop and in the full-load position by a second stop. The travel between these two precisely defined positions can be initiated in a desired manner by the gas-pedal sensor and transmitted to the engine electronics.

Furthermore, in the case of vehicles with automatic transmission, it is desirable to provide a kick down position for the gas pedal.

For a gas-pedal module according to the invention, this may be realized such that, in the case of further-increased pedal pressure in the full-throttle position, the second stop forms a second pivot axis of the gas pedal, the gas pedal lifting off from the bearing element and passing into a kick down position. The changed pivot axis of the gas pedal results in a characteristic signal deviation of the gas-pedal sensor, it being possible for said signal deviation to be clearly assigned to the kick down position.

The level of the change in force which is necessary for achieving the kick down position can be defined in a customer-specific manner such that the second stop, for defining the necessary pedal pressure, is arranged at a certain distance from the bearing element. A third stop expediently serves for limiting the gas-pedal travel in the kick down position.

For pedal-position sensors, use is made nowadays of usually series-produced potentiometers with a slider fixed on the axis of rotation of the pedal arm. With the floating mounting of the gas pedal, this may result in difficulties in certain circumstances since radial movements of the slider on the housing-mounted resistive tracks may result in a signal deviation which cannot be distinguished from a rotary movement. The problem may be eliminated, for example, in that, instead of the potentiometers which have been customary up until now, use is made of sensors which operate with magneto resistive action and react exclusively to the orientation of the magnetic field and thus do not generate any signal deviations in the case of radial movements.

It is also possible for the gas-pedal module according to the invention to operate with potentiometers. For this purpose, it is provided that at least one potentiometer is mounted separately from the gas pedal and can be actuated via elements with play compensation separately in mechanical terms from the gas pedal. The play compensation for mechanical separation is necessary in order to compensate for any possible displacements of the gas pedal in relation to the bearing location. The play compensation may be achieved, for example, in that provided on the potentiometer is a lever arm which butts, under an abutment force provided by a compression spring, against a curved contour on the gas pedal. It is also possible for the lever arm to be guided in a guide slot in the gas pedal.

BRIEF DESCRIPTION OF THE DRAWINGS

The invention is discussed in more detail hereinbelow using exemplary embodiments and with reference to the attached drawings, in which:

FIG. 4 shows a cross section of a further embodiment of a gas-pedal module in the idling position;

FIG. 5 shows the gas-pedal module according to FIG. 4 in a section which has been rotated through 90°.

DETAILED DESCRIPTION OF THE INVENTION

Figure 1:
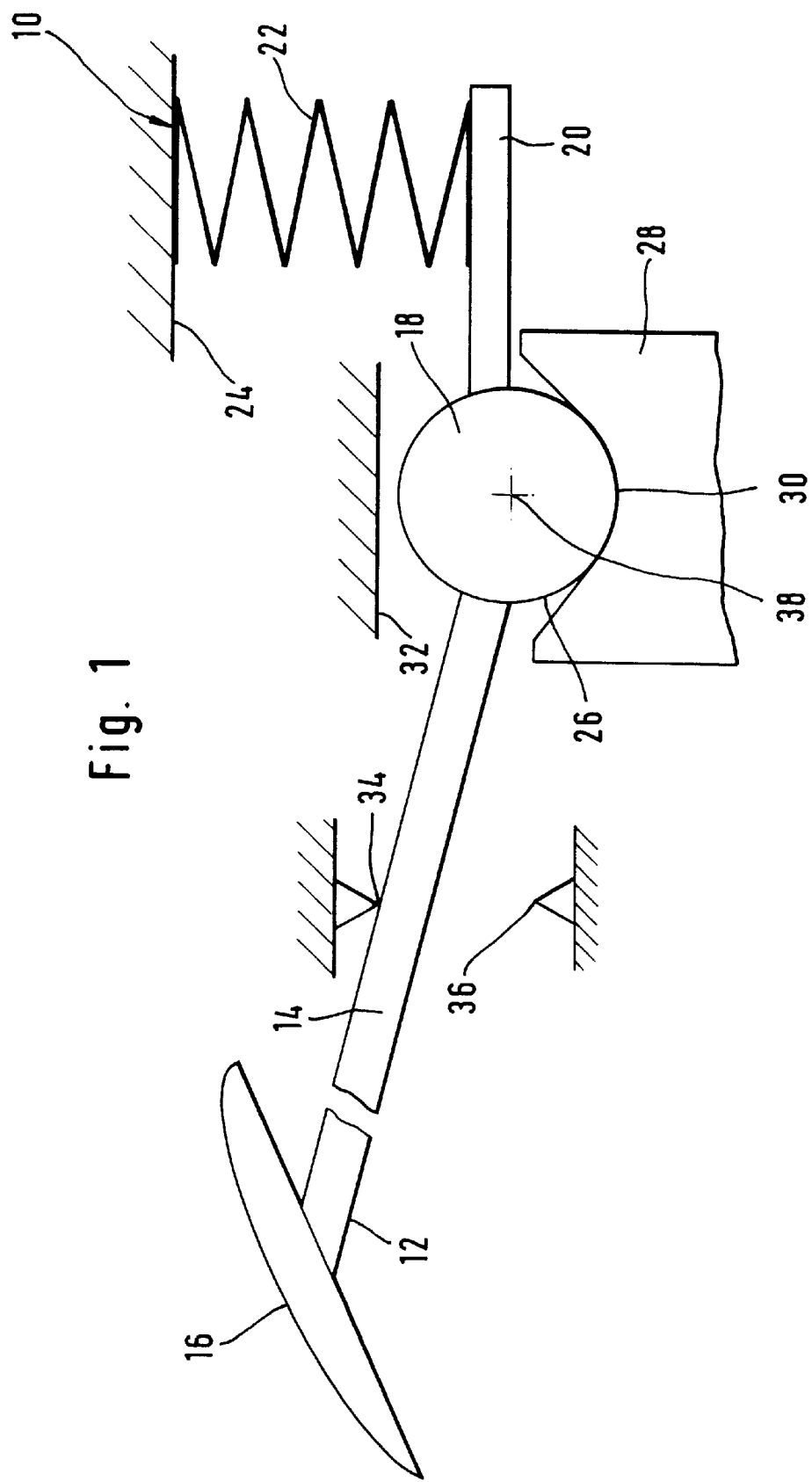
FIG. 1 shows a schematic cross section of a gas-pedal module in the idling position.
Figure 6:
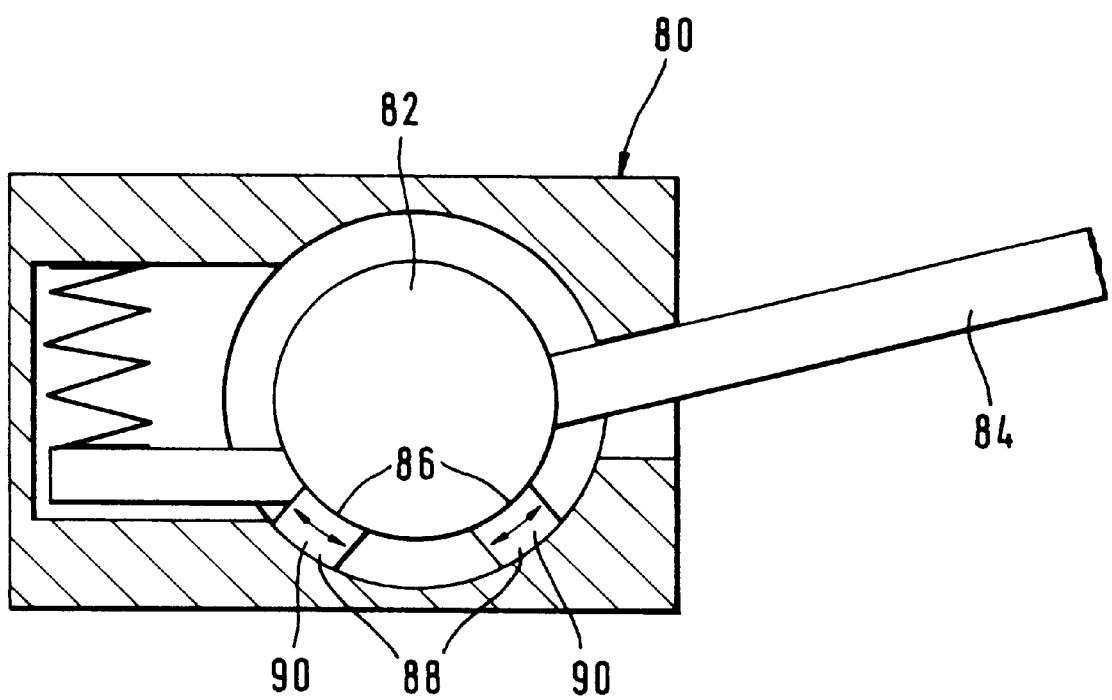
FIG. 6 shows a cross section of a further embodiment of a gas-pedal module in the idling position.

FIG. 1 shows a schematic illustration of a gas-pedal module 10 which usually has a housing (not illustrated), similarly to the variants described in FIGS. 4 to 6.

The gas-pedal module 10 has a gas pedal 12 which comprises a pedal lever 14 with a pedal surface 16, a bearing journal 18 and a second lever arm 20. A prestressed compression spring 22, which is supported on a housing-mounted abutment 24, acts from above on the second lever arm, which is integrally formed horizontally on the bearing journal 18 opposite the pedal lever 14. In this way, the compression spring 22 produces a restoring moment, which counteracts the actuating moment provided by pressure on the pedal surface 16.

The bearing journal 18 has a circumferential surface 26 which is supported in a bearing element 28 which, in the region of an actual contact surface 30 between the circumferential surface 26 and the bearing element 28, is adapted to the contour of the circumferential surface 26. The bearing element 28 is of open configuration in the upward direction, with the result that the bearing journal 18 has a certain amount of play in the upward direction, this being limited by a stop 32. The contact surface 30 is designed as a friction pairing with a certain coefficient of friction, with the result that it is possible to dispense with additional frictional elements necessary for achieving an actuation-dependent force hysteresis. The travel of the pedal lever 14 is limited in the idling position by a first, idling stop 34, which absorbs the restoring moment produced by the compression spring 22 in the idling position of the pedal 12. The bearing force of the bearing journal 18 is determined here from the pre-stressing force of the compression spring 22 and the leverage between the point at which the idling stop 34 acts with the contact surface 30 and the point at which the compression spring 22 acts on the second lever arm 20.

Figure 2:
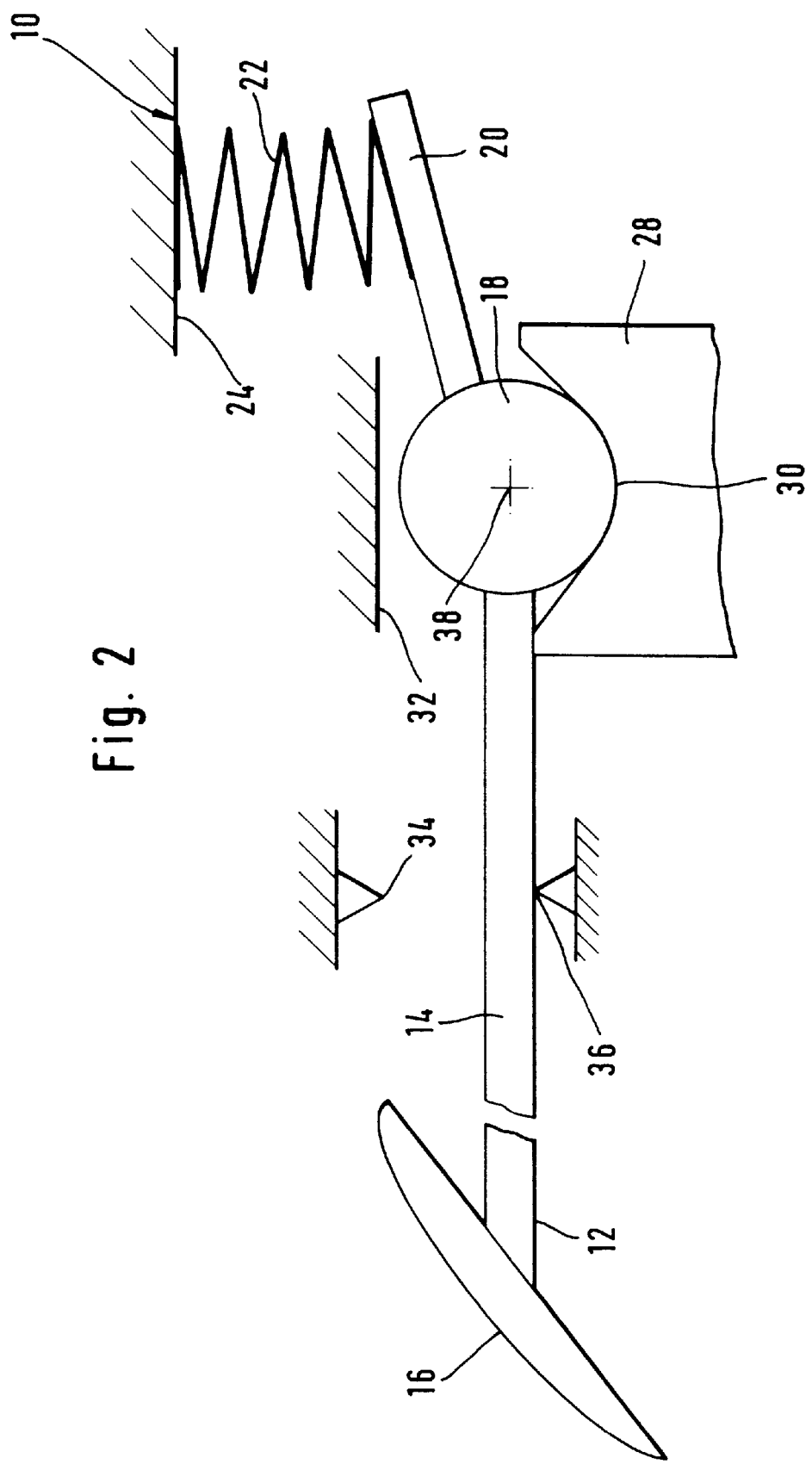
FIG. 2 shows the gas-pedal module according to FIG. 1 in the full-load position.

If, then, a corresponding pressure is exerted on the pedal surface 16, the gas pedal passes, via the partial-load range, into a full-load position, which is illustrated in FIG. 2 and is limited by a full-load stop 36. On account of the contoured contact surface 30, the bearing journal 18 rotates about its center axis 38 in this case without displacement in a radial direction taking place.

When the driver steps on the gas pedal 12, the frictional forces occurring in the contact surface 30 set a resistance against the actuation, this resistance improving the pedal feel, but nevertheless making it easier to hold the pedal 12 in position when the latter is static.

In the case of automatic transmissions, it is desired to provide a so-called kick down position beyond the normal full-throttle position of the gas pedal 12, said kick down position causing shifting down of the transmission. Up until now, it has been customary to provide additional switches which can be initiated by the gas pedal 12. In the case of the above described gas-pedal module 10, however, it is possible to realize a kick down position without such additional elements. In this case, the full-throttle stop 36 serves as a movable bearing for the pedal lever 14, about which the entire gas pedal 12 pivots when the pedal pressure is increased beyond the full-throttle position. By virtue of the gas pedal 12 pivoting about the full-throttle stop 36, the bearing journal 18 lifts off from the bearing element 28, the compression spring 22 being compressed further in the process, and the travel of said bearing journal is limited by the stop 32. The level of the change in force which is necessary for achieving the kick down position can be adapted in a customer-specific manner by variation in the length of the active lever arm between the bearing point of the full-load stop 36 and the bearing location 28. The change in the axis of rotation of the gas pedal 12 also results in a characteristic signal deviation of a pedal-position sensor coupled to the gas pedal 12 (see, for example, FIGS. 4 and 5), with the result that, upon achieving the kick down position, the vehicle electrics can give rise to the corresponding engine and transmission functions.

Once the gas pedal 12 has been released, the compression spring 22 first of all presses the bearing journal back into the contoured contact surface 30 and then ensures that the gas pedal is pivoted back into the idling position about the center axis 38 of the bearing journal 18. On account of the bearing element 28 being constructed to be open in the upward direction, this reliably prevents jamming at the bearing location since the bearing journal can execute extremely small yielding movements, which result in an immediate drop in the frictional forces acting in the contact surface.

It may be expedient, for the floating mounting of the bearing journal 18 in the bearing element 28, to use magneto resistive sensors for sensing the pedal position, said sensors reacting merely to the orientation of the magnetic field and not reacting with undefined changes in signal in the case of the bearing journal 18 being displaced in the radial direction. If, however, it is desired to use the hitherto conventional potentiometers as pedal-position sensors, a gas-pedal module 40 corresponding to the design illustrated in FIGS. 4 and 5 is recommended. The gas-pedal module 40 is illustrated with a housing 42 which has an opening 44 through which a gas pedal 46 runs into the housing interior. In this case, the top edge 48 of the opening 44 forms the idling stop, while the bottom edge 50 forms the full-load stop. A compression spring 52, which is arranged with pre-stressing between a lever arm 54, which is connected to the gas pedal 46, and the housing, ensures the restoring action of the gas pedal 46.

The gas pedal 46 has two bearing journals 56 which are integrally formed laterally and are mounted in bearing locations 58 in the side walls of the housing 42. Although the bearing locations 58 are closed on all sides, it is only the bottom region of their contact surfaces 60 which is designed in accordance with the contour of the bearing journal 56. In the upward direction, the bearing locations have a clearance 62, the top edge 64 of the bearing location 58 forming the stop for the kick down position.

The pedal-position sensor provided for this embodiment is a potentiometer 66, of which the resistive tracks are arranged on a housing wall. The slider 68 is arranged on a pivot lever 70, which is mounted in an essentially play-free manner on a separate shaft 72 in the housing 42. The pivot lever 70 butts against a curved contour 74 on the gas pedal 46, with the result that, in accordance with the configuration of the curved contour 74, pivoting of the gas pedal 46 results in pivoting of the pivot lever 70 and thus in an adjustment of the potentiometer 66. The pivot lever 70 pivots counter to the restoring moment of a torsion spring 76, which is arranged between the housing 42 and the bearing shaft 72 of the pivot lever 70. It is also conceivable to have slot guidance of the pivot lever 70 in a suitable cutout in the gas pedal 46.

As has already been described above, the frictional forces occurring on the contact surfaces 30, 60 ensure a desired pedal-force-dependent hysteresis. The frictional force can be influenced in a specific manner by varying the bearing-journal diameter and the friction pairing on the contact surfaces 30, 60.

Figure 3:
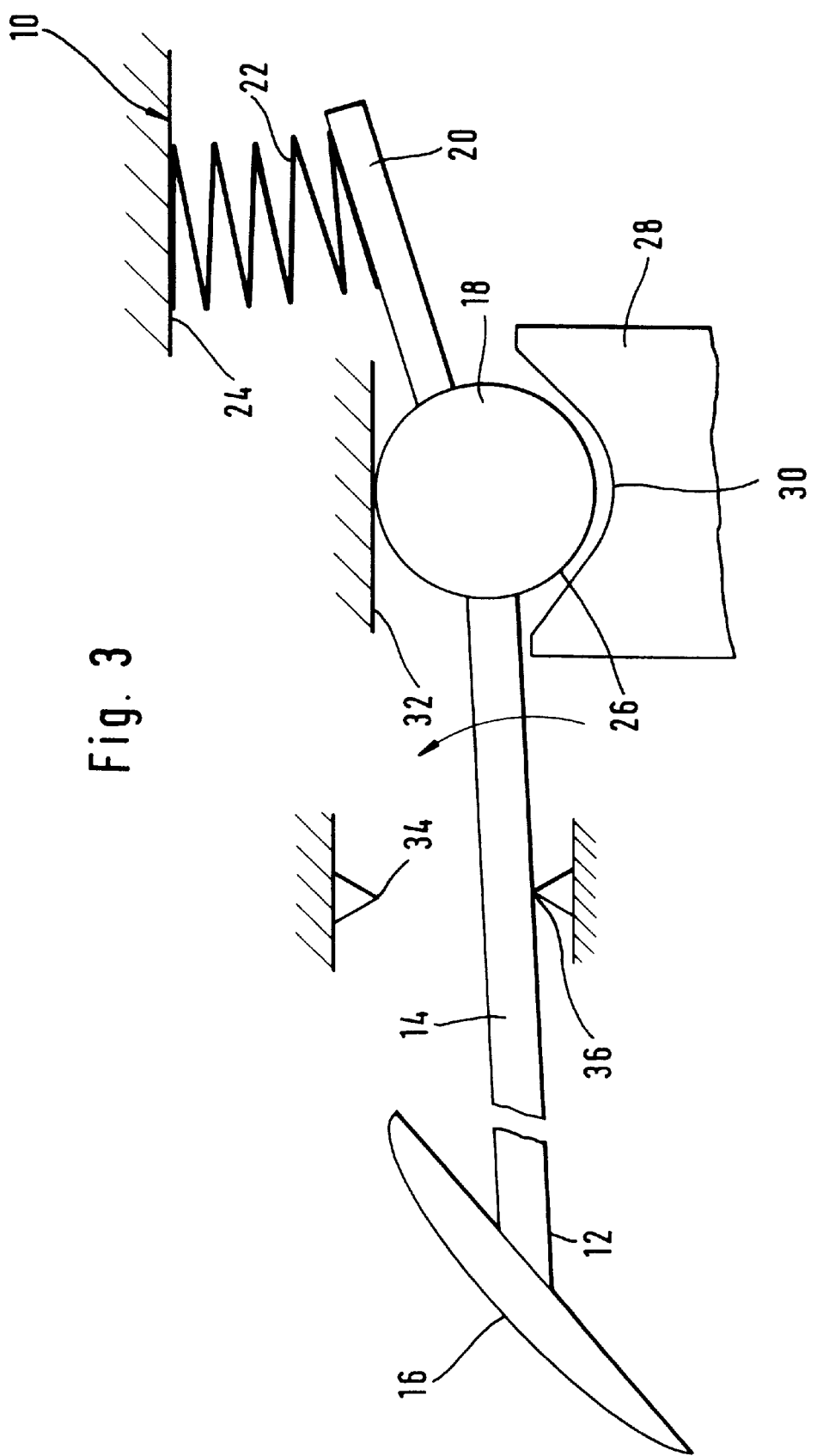
FIG. 3 shows the gas-pedal module according to FIGS. 1 and 2 in the kick down position.

FIG. 6 illustrates a further gas-pedal module 80 which, despite a preselected diameter of the bearing journal 82 of the gas pedal 84 and a preselected friction pairing on the contact surfaces 86 of bearing locations 88, allows the frictional force to be influenced in a specific manner. The gas-pedal module 80 otherwise corresponds to the gas-pedal module 10, which is illustrated in FIGS. 1 to 3.

In contrast to the above described gas-pedal modules 10, 40, the gas-pedal module 80, which is shown in FIG. 6, has two bearing locations 88 arranged at different locations of the circumference of the bearing journal 82. Said bearing locations are arranged adjustably in the circumferential direction, with the result that it is possible to adjust to a certain extent the points at which the radial supporting forces for the bearing journal 82 act. By varying the points at which the forces act, it is possible to change the lever geometry such that the resulting normal force, which is a direct measure of the frictional forces occurring, can be varied. The bearing locations 88 simply comprise in this case friction linings 90, which are optimized in terms of their wear and frictional behavior. This means that one type of gas-pedal modules can be adapted to a wide range of different vehicle types.

Since, in all cases, the frictional force is merely determined from the leverage, the coefficient of friction of the friction pairings and the normal forces of the bearings, wear of the friction linings does not result in any significant change in the actuating characteristics of the gas pedals 12, 46, 84.

The above described modules 10, 40, 80 can be used, in principle, not just in conjunction with gas pedals of motor vehicles but in all "drive-by-wire" systems in which a hysteresis of the actuating force is to be simulated, for example, for simulation of the frictional behavior of Bowden wires which have been used up until now.

What is claimed is:

1. A gas pedal lever module comprising:
   (a) a gas pedal lever having a journal intermediate the ends thereof to enable pivotal movement of the pedal lever about a pivot axis;
   (b) a bearing element having an upwardly facing circumferential surface operably supporting the pedal lever journal, and providing clearance for movement of the journal in the upward direction away from the circumferential surface, the journal and the bearing element having a cooperatively shaped contact surface;
   (c) an idling stop and a full load stop positioned to provide a selected range of pivotal movement of the journal within the bearing element and the full load stop to provide a pivot point causing the journal to raise from the bearing element when the gas pedal lever is moved beyond the preselected journal pivot range; and
   (d) a pedal-lever position sensor which produces an electric signal corresponding to the pedal lever position.

2. The gas pedal lever module as defined in claim 1 wherein a biasing element is operably connected to the gas pedal lever to bias the pedal lever about the pivot axis toward the idling stop position.

3. The gas pedal lever module as defined in claim 2 wherein the biasing element is a helical spring.

4. The gas pedal lever module as defined in claim 1 wherein the journal and the bearing element contact surfaces are designed to have a preselected coefficient of friction.

5. The gas pedal lever module as claimed in claim 4, wherein the bearing element contact surface is subdivided into two circumferential-segment regions (86), which form two radial bearing locations (88).

6. The gas-pedal lever module as claimed in claim 5, wherein at least one said radial bearing location can be adjusted in the circumferential direction in relation to the gas pedal lever.

7. The gas pedal lever module as described in claim 1 wherein the full load stop is arranged a preselected distance from the bearing element.

8. The gas-pedal lever module as claimed in claim 1, wherein the pedal lever position sensor operates with magneto resistive action.

9. The gas-pedal lever module as claimed in claim 1, wherein the pedal lever position sensor has at least one potentiometer, which is mounted separately from the gas pedal lever.

10. The gas-pedal lever module as claimed in claim 9, wherein provided on the potentiometer is a lever arm which butts, under an abutment force provided by a torsion spring, against a curved contour on the gas pedal lever.

* * * * *